Jan. 10, 1961 A. J. CHASE ET AL 2,968,032

SIGNALING SYSTEM

Filed Sept. 23, 1958 3 Sheets-Sheet 1

INVENTORS: A. J. CHASE
W. KALIN
P. L. WISE

BY Lucian C. Canepa

ATTORNEY

Jan. 10, 1961

A. J. CHASE ET AL 2,968,032

SIGNALING SYSTEM

Filed Sept. 23, 1958

3 Sheets-Sheet 2

INVENTORS: A. J. CHASE
W. KALIN
P. L. WISE

BY Lucian C. Canepa

ATTORNEY

Jan. 10, 1961 A. J. CHASE ET AL 2,968,032

SIGNALING SYSTEM

Filed Sept. 23, 1958 3 Sheets-Sheet 3

INVENTORS: A. J. CHASE
W. KALIN
P. L. WISE

BY Lucian C. Canepa

ATTORNEY

United States Patent Office 2,968,032

Patented Jan. 10, 1961

2,968,032

SIGNALING SYSTEM

Albert J. Chase, Walter Kalin, and Paul L. Wise, Indianapolis, Ind., assignors to Bell Telephone Laboratories, Incorporated, New York, N.Y., a corporation of New York Filed Sept. 23, 1958, Ser. No. 762,861

3 Claims. (Cl. 340—393)

This invention relates to signaling systems, and more particularly to telephone signaling systems which include electromagnetically-operated sound output devices.

The signaling equipment commonly employed at a telephone subscriber's station includes an electromagnetically-operated device, generally referred to as a telephone ringer, which responds to each application of ringing current to the subscriber's line to produce an attention-arresting sound signal.

The furnishing of a complete range of telephone service extends to providing a variety of types of sound signals. There have in the past been developed both loud ringing bell and single stroke chime devices. Such devices and the systems of which they form a part should, for obvious reasons of economy, be compatible with existing telephone facilities.

An object of the present invention is an improved signaling system.

More specifically, an object of this invention is an improved telephone signaling system having devices therein which are subscriber-switchable between loud ringing and single stroke chime conditions.

Another object of the present invention is a telephone signaling system which is compatible with existing telephone facilities and which may therefore be economically integrated therein.

A further object of this invention is an improved chime signal circuit.

These and other objects of the present invention are realized in an illustrative embodiment thereof wherein two gongs having resonator shells respectively nested therein are mounted on a base member in combination with a dual condition signaling circuit and a subscriber-controlled mechanism for selecting one of the circuit conditions.

Disposed between the gongs, and in striking relationship thereto, is a driven clapper element which is designed to impact the gongs to cause them to emit either a loud ringing bell or chime signal output, depending respectively on the position of the subscriber-controlled mechanism.

The subscriber-controlled selecting mechanism comprises a pull chain assembly, which assembly includes a flag member whose position indicates the setting (loud ringing bell or chime) of the selecting means. Each operation of the pull chain actuates a cam-ratchet assembly, which assembly in turn moves a series of spring members, one of which is connected to the noted flag indicator. The other spring members serve to connect base-mounted components into either a bell or chime circuit configuration.

In one specific embodiment illustrative of the principles of this invention, the dual condition signaling circuit includes a cold cathode gas tube which, for one position of the selecting means, is employed as a rectifier to operate the device as a single stroke chime signal, and for the other selector position is employed in a conventional manner to provide a loud ringing bell signal output.

Accordingly, a feature of the present invention is a telephone signaling system including a ringer circuit capable of providing either a bell or chime signal, the ringer circuit including a cold cathode gas tube and a subscriber-actuated switch for transferring the gas tube from a bell signal circuit to a single stroke chime signal circuit.

Thus, in accordance with aspects of the invention, there is provided a signaling system having therein a device which, in response to subscriber actuation of a selecting mechanism, emits either a loud ringing bell or a chime sound output.

A complete understanding of the present invention may be gained from a consideration of the following detailed description in conjunction with the accompanying drawings, in which.

Figure 1:
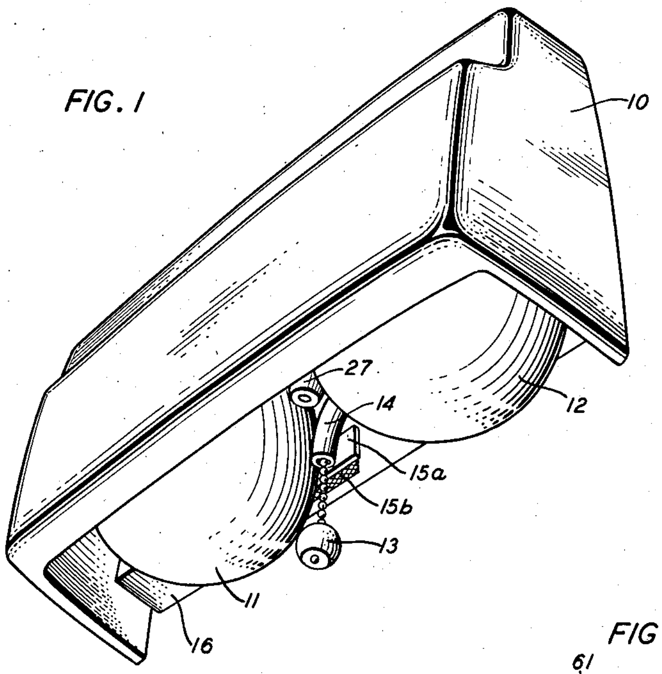
Fig. 1 is a perspective view of a housed signal device of the type designed to be employed in a signaling system illustrative of the principles of this invention.

Fig. 1 shows a station signal or ringer device illustratively embodying aspects of this invention. The signal includes a housing 10, gong members 11 and 12, a pull chain element 13, a tube 14 for guiding the element 13, a flag indicator assembly comprising a flag element **15*a* and a light-sensitive area 15*b*, and a base member 16**.

The housing 10 includes an open bottom which permits easy access to the pull chain 13, maximum visibility of the indicator assembly, and efficient transmission of sound energy from the gongs 11 and 12 to the air surrounding the signal device. Additionally, the housing 10 includes a row of open louvers 18 (Fig. 2) disposed along the front of the housing adjacent to portions of the edges of the gongs 11 and 12. The louvers 18 and an offset mounting arrangement which provides an opening between the housing 10 and the periphery of the base 16 also serve to facilitate the transfer of sound energy from the gongs to the surrounding air.

The thicknesses of the gongs 11 and 12 of the illustrated device may advantageously be so chosen that their fundamental frequencies are related in a tonally pleasing manner. For example, one specific signaling system illustrative of one aspect of the principles of the present invention includes a device of the type shown in Fig. 1 wherein the fundamental frequency of the thicker gong 12 is 1100 cycles per second and that of the thinner gong 11 is 880 cycles per second.

Figure 2:
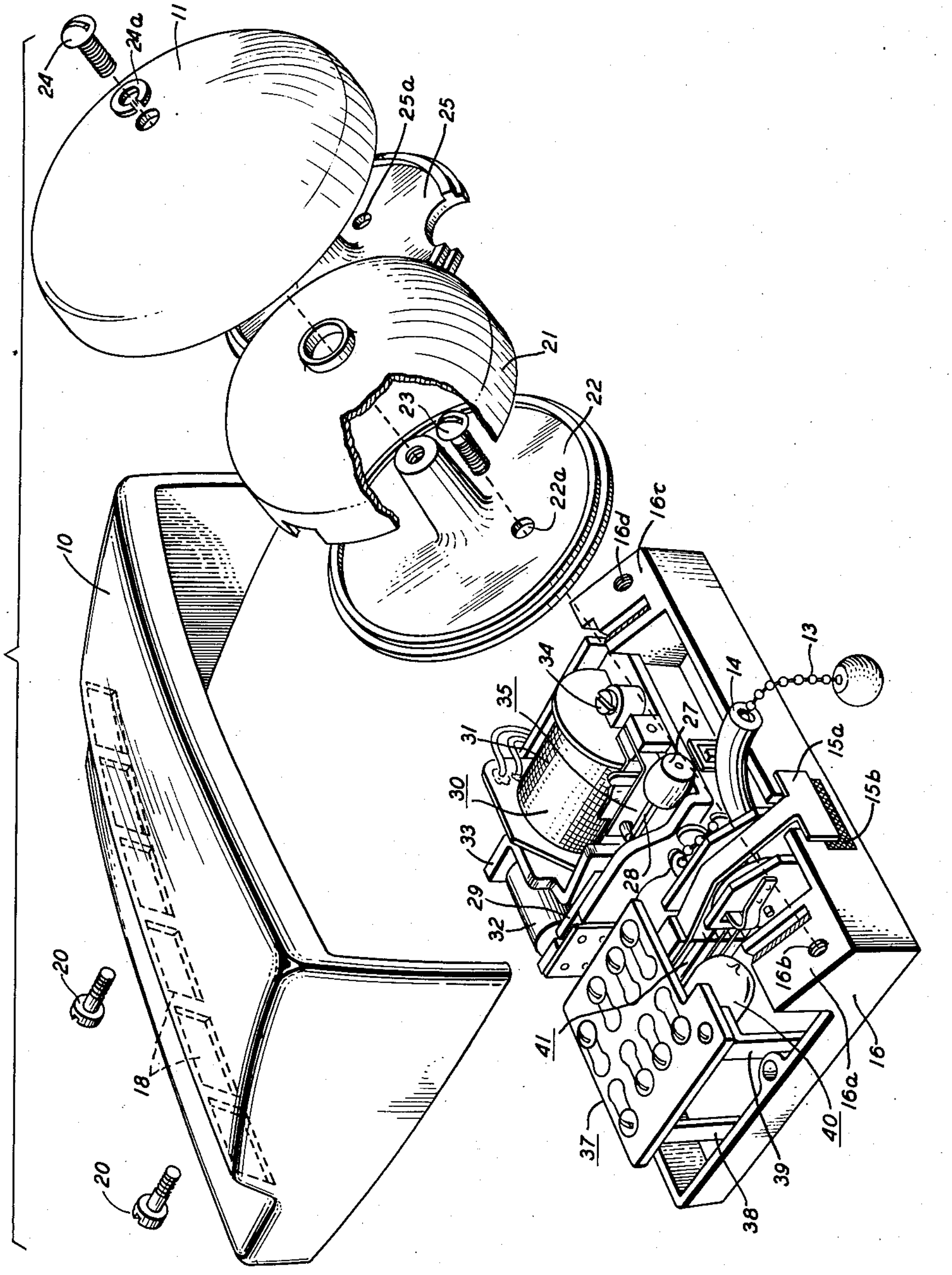
Fig. 2 is an exploded perspective view of the device of Fig. 1.

Fig. 2 shows screw means 20 for securing the housing 10 to the base 16. Also designed to be secured to the base 16 is a left-hand gong assembly comprising the gong 11, a resonator 21, and a gong plate 22. In an assembled signal, the plate 22 is affixed to a slanting front portion 16a of the base 16 by means of a fastening member 23 which extends through an opening 22a in the plate 22 and into an aperture 16b in the base portion 16a. The gong 11 and its resonator 21 are in turn secured to the plate 22 by the members 24 and 24a.

Of the component elements of the right-hand gong assembly, only the gong plate 25 and an opening 25a therethrough are shown in Fig. 2. It is to be understood, however, that the right-hand assembly includes elements which correspond to those of the depicted left-hand assembly, and that the right-hand assembly is designed to be affixed to a base portion 16c by a fastening member which extends into an aperture 16d in the base portion 16c.

When the gong assemblies are mounted on the base 16, in the manner above described, the gongs thereof are, in one illustrative embodiment of this invention, tilted at an angle of approximately 40 degrees from the plane of the base 16, and have disposed between them a clapper element 27 (Figs. 1 and 2).

The clapper element 27 is secured to the end of a clapper rod 28 (Fig. 2), the other end of the rod 28 being affixed to an armature 29. The armature 29 is a component part of an armature assembly 30 of the type described in Patent 2,590,500, which issued to H. A. Bredehoft and M. S. Richardson on March 25, 1952.

Also shown in Fig. 2 are a terminal strip assembly 37 supported on mounting legs 38 and 39, a cold cathode gas tube 40 mounted under the assembly 37 in a suitable base-supported holder device, and a pull chain-operated pile-up of contact elements 41. The pull chain 13 operates the elements 41 through the agency of an assembly which is described in detail hereinbelow.

The armature assembly 30 includes a coil 31, a permanent magnet 32, and a pole piece 33, and is mounted on the base 16 by means including a fastening member 34. Also secured to the base 16, and in operative relationship to the clapper rod 28, is an interrupter assembly 35, which is shown most clearly in Fig. 3.

Figure 3:
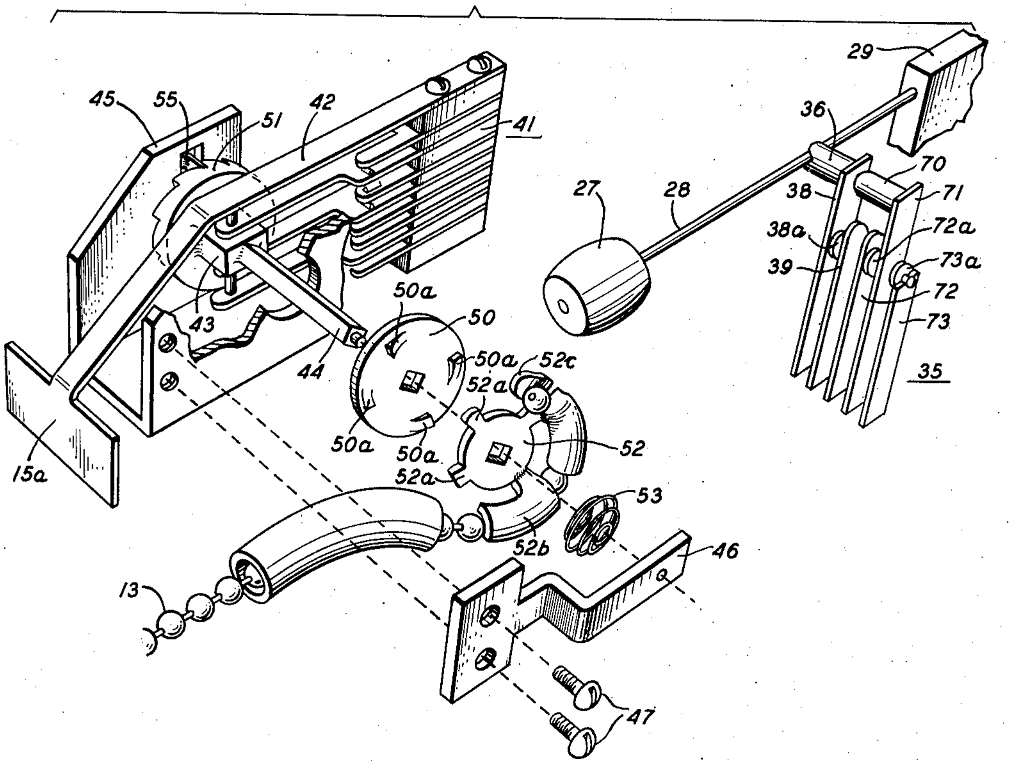
Fig. 3 is an exploded perspective view of a portion of the device of Fig. 1.

The interrupter assembly 35 includes an insulating stud 36 one end of which is formed to fit the contour of the clapper rod 28, and the other end of which is secured to a spring arm 38. The arm 38 carries thereon a contact surface 38a which is designed to mate with another contact surface (not shown) on a spring arm 39 when the clapper rod 28, and thus the stud 36, is moved to the right (Fig. 3). The utility of the assembly 35 will be described below in connection with the descriptions of the circuits of Figs. 4A, 4B and 4C.

The contact assembly 41 (Fig. 3) includes an uppermost arm 42 whose frontwardly projecting portion forms the above-mentioned flag indicator 15a. The indicator 15a is moved upwards by the rotation of a cam element 43 through 90 degrees in a clockwise direction, from the position shown in Fig. 3, in response to actuation of the pull chain 13, thereby revealing the light-sensitive area 15b (shown in Fig. 1).

It is of course to be understood that the flag indicator shown and described herein may be coupled to and actuated by the pull chain in a number of different ways, depending on the particular mounting arrangement and visibility requirements of a given installation. Also, it is to be noted that station units made in accordance with the principles of the present invention may include indicators of a type other than a flag member, for example, an indicator light. And, further, it is feasible to substitute for the pull chain mechanism any other suitable switching device, such as, for example, a rack moved by a handle-operated pinion.

Other arms of the contact assembly 41 include rearwardly extending lug portions (not shown) to which electrical connections can be readily made, and further include frontwardly extending portions on which are mounted mating contact surfaces. The mating surfaces are carried into and out of contact with each other by the rotation of the cam 43 in a clockwise direction by a cam shaft 44.

The shaft 44 is rotatably mounted between end bracket members 45 and 46, which members are designed to be secured to each other by fasteners 47. The shaft 44 has fixedly secured thereto a gear washer 50, the cam 43, and a locking wheel 51.

The assembly for actuating the contacts 41 further includes a sprocket 52 and a sprocket return spring 53.

Operation of the contact-actuating assembly is best understood by a close inspection of Fig. 3, and is as follows: Pulling the chain 13 rotates the sprocket 52 in a clockwise direction against the opposing force of the spring 53. The sprocket 52 and the shaft 44 are related in a slip-mounted fashion; thus, only the sprocket 52 rotates until such time as one of its radial projections 52a butts against one of the upraised portions 50a of the fixedly mounted gear washer 50, at which time further rotation of the sprocket 52 causes the washer 50, the shaft 44, the cam 43, and the locking wheel 51 to turn in a clockwise direction. The extent of the clockwise movement is limited by a portion 52b of the sprocket 52 striking a lower face of the bracket 46. Release of the chain 13 then allows the spring 53 to restore the sprocket to its normal position, in which position a portion 52c rests against an upper face of the bracket 46.

The shaft 44 and the members 43, 50 and 51, secured thereto are not similarly restored by the spring 53 when the chain 13 is released because a spring strip 55 restrictively engages the teeth of the member 51 such that only clockwise rotation of the member 51 is permitted. Thus, most of the clockwise movement imparted to the contact-actuating assembly by the chain 13 is preserved by the coaction between the locking wheel 51 and the strip spring 55.

The specific contact-actuating assembly shown in Fig. 3 rotates the cam 43 through 90 degrees for each operation of the pull chain 13, and so alternately raises and lowers the flag 15a as the mating contact surfaces of the pile-up 41 are selectively operated. The contact surfaces are so arranged that the circuit configurations formed thereby are those required respectively for chime and for loud ringing bell sound outputs.

Figure 4B:
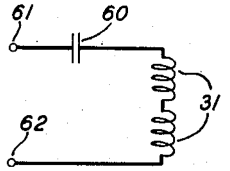
Fig. 4B depicts the ringing bell configuration of the system of Fig. 4A.

Fig. 4B, which depicts the loud ringing bell circuit configuration for individual and two-party telephone service, shows the winding 31 of the above-described signal connected in series with a capacitor 60. These series-related elements are in turn connected to ringing power terminals 61 and 62.

Figure 4A:
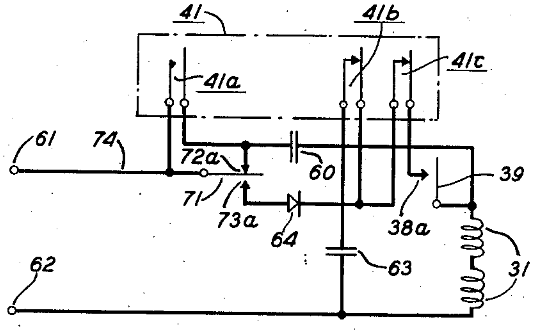
Fig. 4A is a schematic representation of a telephone signaling system, including the device of Fig. 1, which is designed to provide either a ringing bell or a chime sound output for individual or two-party service.
Figure 4C:
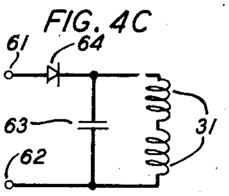
Fig. 4C depicts the chime output configuration of the system of Fig. 4A.

Fig. 4C, which depicts the chime circuit configuration for individual and two-party telephone service, shows the winding 31 connected in parallel with a capacitor 63, and further shows the parallel-related elements connected through a rectifier 64 to the ringing power terminals 61 and 62.

An arrangement of contacts which would simply provide, in response to actuation of the pull chain 13, either the circuit of Fig. 4B or that of Fig. 4C would not be entirely satisfactory for incorporation into some telephone systems, for the chime circuit configuration represents a relatively low impedance, which from the standpoint of bridging and noise pick-up, among other considerations, has been found to be disadvantageous.

Accordingly, the above-described interrupter assembly 35 may advantageously be arranged in the circuit of Fig. 4A in such a manner that, when the chain 13 is operated to the chime position, the impedance presented to the ringing terminals 61 and 62 is initially that of the ringer or bell circuit. And only when ringing power is actually applied to the terminals 61 and 62 is the chime circuit configuration connected into the signaling system. This automatic selective connecting function is performed by the clapper rod-driven assembly 35 including the elements 38a and 39, which elements, shown connected in the circuit of Fig. 4A, were described above in connection with Fig. 3.

Also shown in Fig. 3 are an insulating stud 70 mounted on an armature 71, and contact members 72*a* and 73*a* carried respectively by conductive strips 72 and 73.

Fig. 4A shows the armature 71 and the contact members 72*a* and 73*a* of the assembly 35 arranged in combination with the contacts of the chain-operated pile-up 41 and the components 31, 60, 63 and 64.

The contacts of the pile-up 41 are shown in Fig. 4A in the chime circuit position. In this position an electrical circuit extends from the terminal 61 along a conductor 74, through the armature 71 to the contact 72*a*, through the capacitor 60, and then through the coil 31 back to the other ringing power input terminal 62. This configuration, it is noted, is the ringing circuit of Fig. 4B, although, as pointed out above, the pile-up 41 is in its chime condition.

When a suitable ringing voltage is impressed across the terminals 61 and 62 of the circuit of Fig. 4A, the clapper rod 28 (Fig. 3) moves to the right, and, in so doing, switches the armature 71 of the assembly 35 from the contact 72*a* to the contact 73*a*, thereby connecting the rectifying means 64 and the capacitor 63 to the terminal 61. As the clapper rod 28 continues on its stroke to the right, the elements 38*a* and 39 of the assembly 35 are caused to move together into contacting relationship, thereby forming the chime circuit configuration shown in Fig. 4C.

When a subscriber actuates the chain 13 to arrange the signal device of the circuit of Fig. 4A in its loud ringing bell condition, the contact elements 41*a*, 41*b* and 41*c* of the assembly 41 are switched to positions respectively opposite to those shown in Fig. 4A, thereby effectively removing the contacts of the clapper rod-actuated assembly 35 from the circuit and forming the configuration shown in Fig. 4B. The application of a suitable alternating current ringing voltage to the terminals 61 and 62 of the loud ringing bell circuit of Fig. 4B causes the clapper element 27 to move back and forth against the gongs 11 and 12 at a rate determined by the frequency of the ringing voltage, thereby producing from the gong a bell-type sound output.

On the other hand, the application of a suitable alternating current ringing voltage to the terminals 61 and 62 of the chime circuit of Fig. 4C causes the clapper element 27 to impact the gong 12 once to produce therefrom an 1100 cycle per second signal. The element 27 then remains in its operated position until ringing voltage is removed from the terminals 61 and 62, at which time the element 27 swings back past its normal or rest position to strike the gong 11 once to produce therefrom an 880 cycle per second sound output. Thus, the chime circuit of the herein-considered device provides a bing-bong signal for each interval of application of ringing power to the terminals 61 and 62.

Figure 5B:
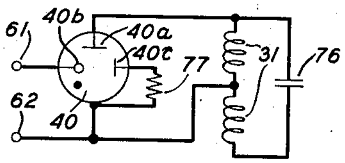
Fig. 5B depicts the ringing bell configuration of the system of Fig. 5A.
Figure 5A:
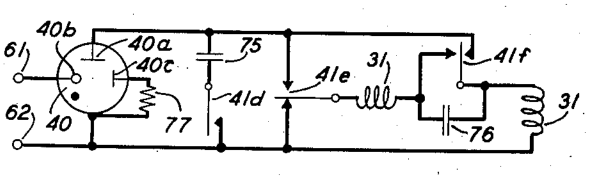
Fig. 5A is a schematic representation of a telephone signaling system, also including the device of Fig. 1, which is designed to provide either a ringing bell or a chime sound output for fully selective four-party service.

For fully selective four-party telephone service, the circuit shown in Fig. 5A may advantageously be employed to produce ringing and chiming signals from the specific illustrative device herein described. This circuit includes a cold cathode rectifying tube 40, the coil 31, contact assemblies 41*d*, 41*e* and 41*f* of the chain-operated pile-up 41, capacitors 75 and 76, and a resistor 77.

The contact assemblies 41*d*, 41*e* and 41*f* are shown in Fig. 5A in the ringing bell position, and the circuit formed thereby has been redrawn as Fig. 5B. The configuration of Fig. 5B is a well-known one and a description thereof is found in the October 1954 issue of the Bell Laboratories Record, starting at page 366.

The rectifying element 40 may, for example, be a tube having mixture of neon and other inert gases at low pressure therein. The element 40 may also illustratively include an operating anode 40*a*, a cathode 40*b* and a starter anode 40*c*.

Figure 5C:
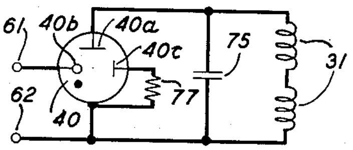
Fig. 5C depicts the chime output configuration of the system of Fig. 5A.

When the contact assemblies 41*d*, 41*e* and 41*f* are switched by the pull chain 13 to positions respectively opposite to those shown in Fig. 5A, there is formed the chime circuit configuration of Fig. 5C.

The chime circuit of Fig. 5C operates in a manner similar to that of the circuit of Fig. 4C. More specifically, both the element 64 of Fig. 4C and the element 40 of Fig. 5C serve to pass a pulsating unidirectional current to their respectively associated parallel circuits. These circuits include the components 63 and 31 (Fig. 4C) and 75 and 31 (Fig. 5C). Each passed pulse of current energizes the coil 31, thereby causing the armature 29 and the clapper element 27 coupled thereto to strike the gong 12. An applied pulse also charges the capacitors 63 (Fig. 4C) and 75 (Fig. 5C). Thus, during the time that the rectifiers 64 and 40 block the applied ringing voltage from the coil 31, the capacitors 63 and 75 empty their accumulated charges through the coil 31, thereby maintaining the clapper element 27 in an energized condition.

The element 27 is released from the energized condition soon after the applied ringing voltage is removed from the terminals 61 and 62. The clapper element 27 then overswings its rest position and strikes the other gong 11 to produce therefrom a sound output. Thus, a chime or bing-bong sound output is produced for each interval of application of alternating current ringing power to the terminals 61 and 62 of the circuit configurations depicted in Figs. 4C and 5C.

In summary, aspects of the present invention are illustratively embodied in a station signal system capable of providing either a ringing bell or a chime sound output.

It is of course to be understood that the above-described arrangements are illustrative and not restrictive of the principles of the present invention. Other arrangements may be devised by those skilled in the art without departing from the spirit and scope of this invention. For example, the principles of the present invention are not restricted to a signaling system having a cold cathode gas tube therein, but are equally applicable to systems having other kinds of rectifying or switching elements therein, for example, a silicon P-N-P-N diode of the type described by J. M. Goldey, N. Holonyak, J. L. Moll and M. Tannenbaum, in an article entitled "P-N-P-N Transistor Switches," which appears at pages 1174-1182 of the September 1956 issue of the Proceedings of the IRE.

It is also to be noted that the principles of the present invention extend to a ringer in which ringing positions other than "chime" and "loud ring" are selectable. Thus, for example, a "soft ring" position may be provided, in which position a snubbing device is positioned in close proximity to the clapper rod, thereby to restrict the motion of the rod and to produce a low level single gong ring.

What is claimed is:

1. In combination in a system capable of providing either a chime or ringing signal sound output, a pair of signaling power terminals, a signaling winding, a clapper assembly movable in response to the energization of said winding, circuit means including a chime signal circuit configuration and a ringing signal circuit configuration, subscriber-actuated means for connecting said winding to said terminals by means of one of said chime and ringing signal circuit configurations, and clapper-actuated means for switching said system to the chime circuit configuration only when said subscriber-actuated means is switched to the chime circuit condition and power is actually applied to said terminals, so that, except when said subscriber-actuated means is in the chime circuit connecting position and signal power is actually applied to said terminals, the impedance of the system connected to said terminals is characteristic of said ringing circuit configuration.

2. A dual condition signal circuit comprising a pair of signal gongs, a signaling winding, a clapper positioned in a striking relationship to said gongs and movable in response to the energization of said winding, a first capacitor, a second capacitor, subscriber-actuated switch means settable to either a ringing bell positioned or a single stroke chime sound position, circuit means including said switch means when operated to either said ringing bell position or said chime sound position for establishing a series path connection between said first capacitor and said winding, circuit means including said switch means when operated to said chime sound position for partially establishing a parallel path connection between said second capacitor and said winding, and clapper-actuated switch means operable in response to the movement of said clapper for opening said series path connection and completing said parallel path connection.

3. In combination in a signaling system, a signaling winding, a clapper movable in response to the energization of said signaling winding, first and second capacitors, subscribed-actuated means switchable to either a ringing bell or a chime sound position, clapper-actuated switching means, circuit means responsive to the actuation of said subscriber-actuated means to either of its positions for interconnecting said first capacitor and said winding in series, and circuit means including said clapper-actuated switching means responsive to the actuation of said subscriber-actuated means to the chime sound position and to the energization of said winding for breaking the series connection between said first capacitor and said winding and for connecting said second capacitor and said winding in parallel, whereby the impedance of said system is always that of the series combination of said first capacitor and said winding except for the time when said subscriber-actuated means is in its chime sound position and said signaling winding is actually energized.

References Cited in the file of this patent

UNITED STATES PATENTS

| | | |
|---|---|---|
| 2,260,524 | Hersey | Oct. 28, 1941 |
| 2,428,007 | Boardman | Sept. 30, 1947 |
| 2,861,136 | Brison | Nov. 18, 1958 |